US 6,615,359 B2

(12) United States Patent
Eyres et al.

(10) Patent No.: US 6,615,359 B2
(45) Date of Patent: *Sep. 2, 2003

(54) MODIFIED LICENSE KEY ENTRY FOR PRE-INSTALLATION OF SOFTWARE

(75) Inventors: Kevin W. Eyres, Tomball, TX (US); Michael H. Lee, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/994,174

(22) Filed: Nov. 26, 2001

(65) Prior Publication Data

US 2002/0035693 A1 Mar. 21, 2002

Related U.S. Application Data (63) Continuation of application No. 09/033,257, filed on Mar. 2, 1998, now Pat. No. 6,324,649.

(51) Int. Cl.[7] ................................................ H04L 9/00
(52) U.S. Cl. ........................................ 713/202; 714/38
(58) Field of Search ............................... 713/200, 201, 713/202; 714/38, 39, 40

(56) References Cited

U.S. PATENT DOCUMENTS

| 4,924,378 | A |   | 5/1990  | Hershey et al. |
|-----------|---|---|---------|----------------|
| 5,390,297 | A |   | 2/1995  | Barber et al.  |
| 5,479,612 | A |   | 12/1995 | Kenton et al.  |
| 5,490,216 | A |   | 2/1996  | Richardson, III |
| 5,553,143 | A |   | 9/1996  | Ross et al.    |
| 5,708,709 | A |   | 1/1998  | Rose           |
| 5,758,068 | A |   | 5/1998  | Brandt et al.  |
| 5,758,154 | A |   | 5/1998  | Qureshi        |
| 5,758,165 | A | * | 5/1998  | Shuff ...................... 717/178 |
| 5,771,347 | A |   | 6/1998  | Grantz et al.  |
| 5,825,893 | A |   | 10/1998 | Kara           |
| 5,935,243 | A |   | 8/1999  | Hasebe et al.  |
| 5,964,877 | A |   | 10/1999 | Victor et al.  |
| 5,982,892 | A |   | 11/1999 | Hicks et al.   |
| 6,243,741 | B1 | * | 6/2001 | Utsumi ...................... 709/208 |
| 6,324,649 | B1 | * | 11/2001 | Eyres et al. ................ 713/202 |

OTHER PUBLICATIONS

Person, et al., *Platinum Edition Using Windows 95, Second Edition*, pp. 677–678 (Dec. 1997).

*ManagePro Getting Started Guide, Ver. 2.0*, Avantos Performance Systems, Inc., pp. 1 and 9–16 (Dec. 1993).

* cited by examiner

*Primary Examiner*—Dieu-Minh Le (57) ABSTRACT

A method and computer system according to the disclosed invention allows the pre-installation of a software application without a license key. The computer system installs a software application and provides a prompt for a license key. The license key is stored in a registry. If the license key is not entered, the computer system installs the software application and installs disabling code. At startup, the disabling code is executed if installed, providing a prompt for a license key. If the proper license key is entered, the computer system stores the key in a registry and uninstalls the disabling code, allowing installation of the software application. If an improper key is entered, the computer system allows the key to be reentered.

8 Claims, 9 Drawing Sheets

FIG. 1

*(PRIOR ART)*

MODIFIED LICENSE KEY ENTRY FOR PRE-INSTALLATION OF SOFTWARE

CROSS-REFERENCE TO RELATED APPLICATIONS

This application is a continuation of application Ser. No. 09/033,257, filed Mar. 2, 1998, now U.S. Pat. No. 6,324,649 which is incorporated herein by reference in its entirety.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to pre-installation of software, and more specifically to modifying the software to allow for a License Key to be entered after the installation of the software but before the execution of the software.

2. Description of the Related Art

Computers are becoming increasingly important in many aspects of life, including homes and businesses. As computers become more important, more advances in computer capabilities are discovered. Previously, computer systems sold by computer hardware manufactures were often sold with few, if any, software applications pre-installed. The end-user had the responsibility to purchase the desired software applications. After the purchase, the end-user would install the software on the computer system. The installation process often required the end-user to enter details concerning the physical embodiment of the computer system, including the make and model of peripheral devices. This interaction often caused difficulties for the end-user who was not familiar with computer terminology or with the specific computer system.

Through the combined efforts of the computer system providers and the software providers, computer systems containing a substantial number of software applications, pre-installed on the computer system, have become available through standard retailers. This has allowed the end-user, who may have few computer skills, to purchase a computer system which can be utilized with little user know-how. However, this change in the marketing of the computer systems has added to the growing problem of computer software pirating.

One problem that has plagued software providers for years is software pirating. Software pirating is the unauthorized copying of the computer software or associated software documentation. Software pirating generally occurs in two distinct forms. The first is software pirating by an unlicensed user. The unlicensed user "borrows" a copy of a software application from an acquaintance or from their employer. The software is then copied, allowing the unlicensed user to keep a copy of the software application while returning the original to the legal licensee. The second type of software pirating occurs when an individual or business copies a software application intending on selling the pirated software application. Software providers have combated pirating by including license key or registry information prompts in the installation software. Typically, the installation software prompts the end-user to enter a license key, provided by the software provider separate from the software, before installation of the software is initiated. If the license key is not provided, the software cannot be installed.

This, however, contradicts the objective accomplished by providing the software pre-installed on the computer systems. Computer system hardware and software providers desire efficient processes to pre-install the software without losing the inherent protection of license keys.

Typically, the pre-installed software applications provided on the computer systems either do not include license key protection or the software is partially installed, requiring the end-user to complete the installation process. An example of this is when a software application is included on the computer system, but the software is present only in a compressed form. During final installation, the install program asks for a license key, then decompresses the software and installs the decompressed software application. Neither of these solutions fully satisfies both the computer hardware and the software providers. Therefore, advancement in the ability to pre-install software on a computer system while maintaining software protection is desirable.

SUMMARY OF THE INVENTION

A method and computer system according to the disclosed invention allows the preinstallation of a software application without a license key. The computer system installs the software application and provides a prompt for a license key. The license key can be entered at this time, if so, the key is stored in the registry. The license key is generally provided by the software provider with the software application documentation. If the license key is not entered, the computer system installs the software application and installs disabling code. The disabling code is executable at startup. An advantage is that the computer system manufacturer can install the software application, relieving the end-user from this task.

At startup, the disabling code is executed, if installed, determining if a license key is stored in the registry before providing a prompt for a license key if no key is stored in the registry. If a proper license key is entered, the computer system stores the key in the registry and un-installs the disabling code. If an improper key is entered, the computer system allows a key to be reentered or the disabling code is exited.

The software application can be executed by the user. When the software application is executed, the computer system determines if a license key for the software application is stored in the registry. If a license key for the software application is stored in the registry, the software application is run. If no license key for the software application is stored in the registry, the computer system provides a prompt for the key. If a proper key is entered, the computer system stores the license key in the registry and runs the software application. If an improper key is entered, the computer system prompts for a license key. The software application can be installed such that execution occurs automatically with startup. However, license key verification occurs as previously discussed.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
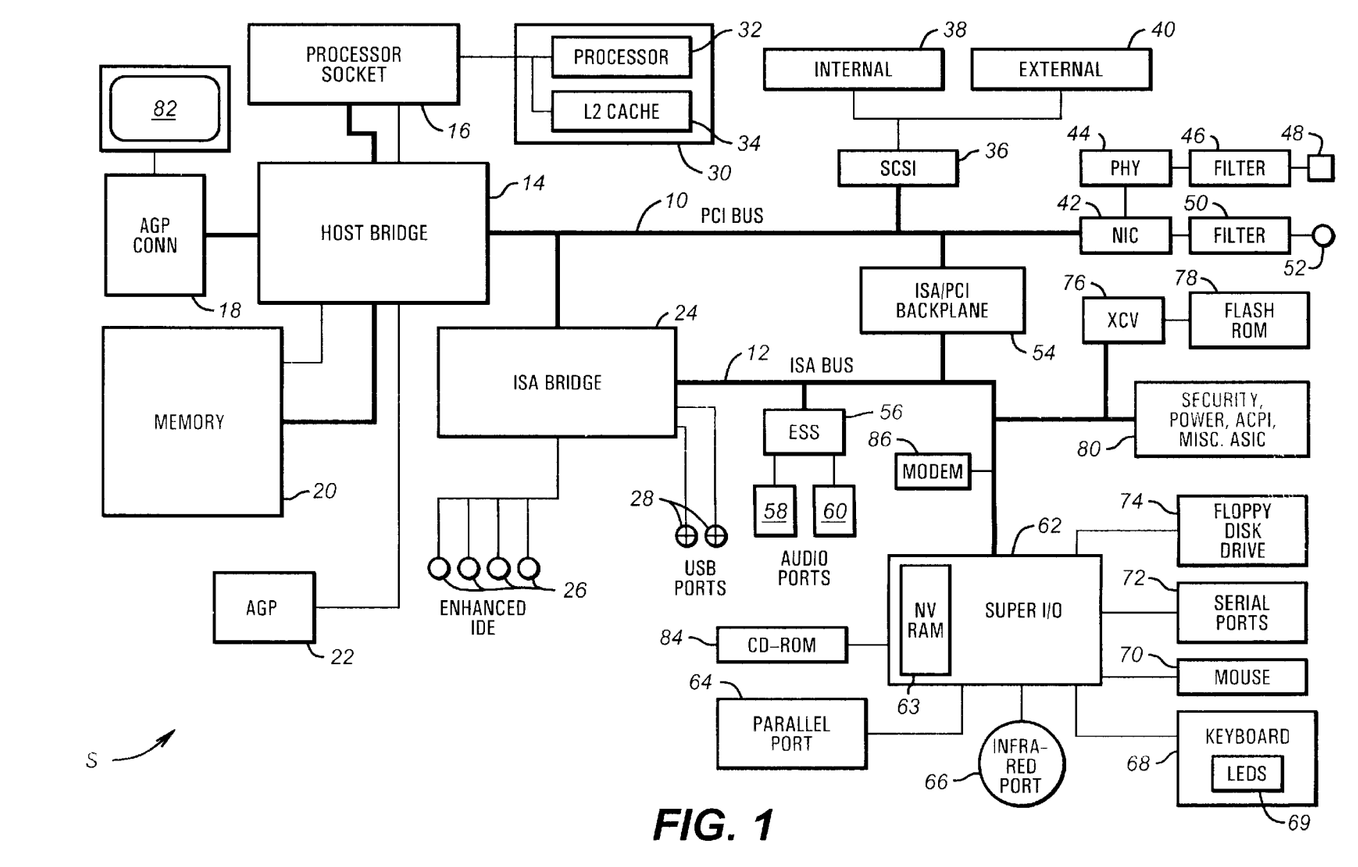
FIG. 1 is a block diagram of typical computer system according to the present invention.

Turning to FIG. 1, illustrated is a typical computer system S implemented according to the invention. While this system is illustrative of one embodiment, the techniques according to the invention can be implemented in a wide variety of systems. The computer system S in the illustrated embodiment is a PCI bus/ISA bus-based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the ☐ISA bridge☐) bridges between the PCI bus 10 and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. A video display 82 can be coupled to the AGP connector 18 for display of data by the computer system S. The ISA bridge 24 further includes an internal enhanced IDE controller for controlling up to four enhanced IDE drives 26, and a universal serial bus (USB) host controller 25 for controlling USB ports 28 in accordance with the present invention.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with processors other than the Pentium II without detracting from the spirit of the invention.

The host bridge 14, when the Intel 440LX Host Bridge is employed, supports a memory subsystem 20 (or main memory) of extended data out (EDO) dynamic random access memory (DRAM) or synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and nonintegral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a direct memory access (DMA) controller, two 82C59 interrupt controllers, an 8254 timer, a real time clock (RTC) with a 256 byte complementary metal oxide semiconductor (CMOS) static RAM (SRAM), and chip selects for system read only memory (ROM), RTC, keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which is based on the inter-integrated circuit ($I^2C$) protocol.

The PCI bus 10 couples a variety of devices that generally take advantage of a high-speed data path. This includes a small computer system interface (SCSI) controller 36, with both an internal port 38 and an external port 40. In the disclosed embodiment, the SCSI controller 36 is an AIC-7860 SCSI controller. The external port 40 can be attached to mass storage subsystems, such as a hard disk drive or a tape drive. Also coupled to the PCI bus 10 is a network interface controller (NIC) 42, which preferably supports the ThunderLan™ power management specification by Texas Instruments. The NIC 42 is coupled through a physical layer 44 and a filter 46 to a RJ-45 jack 48, and through a filter 50 to an AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. The Super I/O 62 contains several logical devices, one of which is a Real Time Clock (RTC). Resident in the RTC of the Super I/O chip 62 is non-volatile Random Access Memory (NV RAM) 63. This Super I/O chip 62 provides a variety of input/output functionality, including a parallel port 64, an infrared port 66, a keyboard controller for a keyboard 68, a mouse port for a mouse 70, additional series ports 72, a CD-ROM controller for a CD-ROM drive 84, and a floppy disk drive controller for a floppy disk drive 74. These devices are coupled through connectors to the Super I/O 62. Resident on the keyboard 68 are light emitting diodes (LEDs) 69. The floppy disk drive 74 includes disk drives for a 3 ½" and 5 ¼" floppy disks and Advanced Technology Attachment Packet Interface (ATAPI) drives, including the LS-120 drives.

The CD-ROM drive 84 of the disclosed embodiment is a standard 16x speed CD-ROM, however, varying speed CD-ROM drives could be implemented without detracting from the spirit of the invention. The CD-ROMs for use with the CD-ROM drive 84 include, but are not limited to, CD-ROMs containing software applications and the associated software installation applications. CD-ROMs can be used to install software applications on the computer system S.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement. An exemplary BIOS according to the invention is shown below.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic. The ISA bus 12 is also coupled to a modem 86. The modem 86 contains connectors which can be implemented to connect the computer system S to an external network. The modem 86 can be used to load software applications and software installation programs on to the computer system S.

Figure 2:
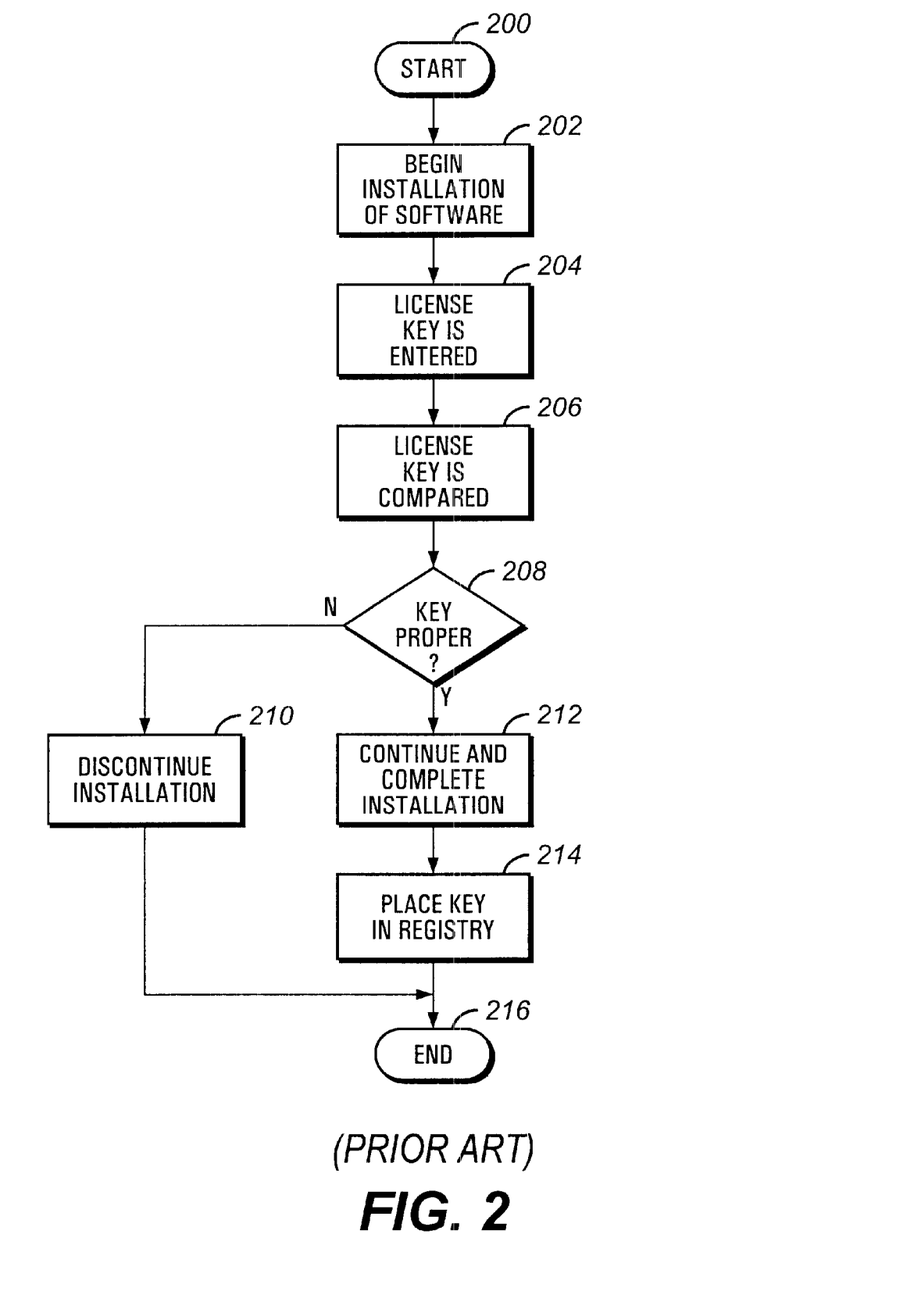
FIG. 2 is a flow chart of the license key entry and registration process as disclosed in the prior art.

Turning now to FIG. 2, a flow chart of the license key entry and registration process as disclosed in the prior art is shown. The process begins with step 200, start. Next, in step 202, installation of the software begins. A license key prompt is provided and a license key is entered in step 204. The license key is compared in step 206. The license key can be compared with data contained in a table resident on the installation software media. Also, the license key that is entered can be compared using a solution algorithm resident in the installation software. The solution algorithm uses the license key as an input into the algorithm; then the output determined from the algorithm is compared to see if it falls within the allowed parameters as set by the software provider. If the output is within the parameters, then the license key is a proper license key and is accepted. Next, in step 208, the license key is determined using the comparison process as discussed above. If the license key is not proper, the process continues with step 210, where the installation is discontinued and the process ends. If the license key is proper, as determined above, the process continues with step 212 where the installation is continued and completed. Next in step 214, the license key entered is placed in a registry. The license key and the user name, if entered, are stored to identify this software application with that license key and user. The process ends in step 216.

Figure 3A:
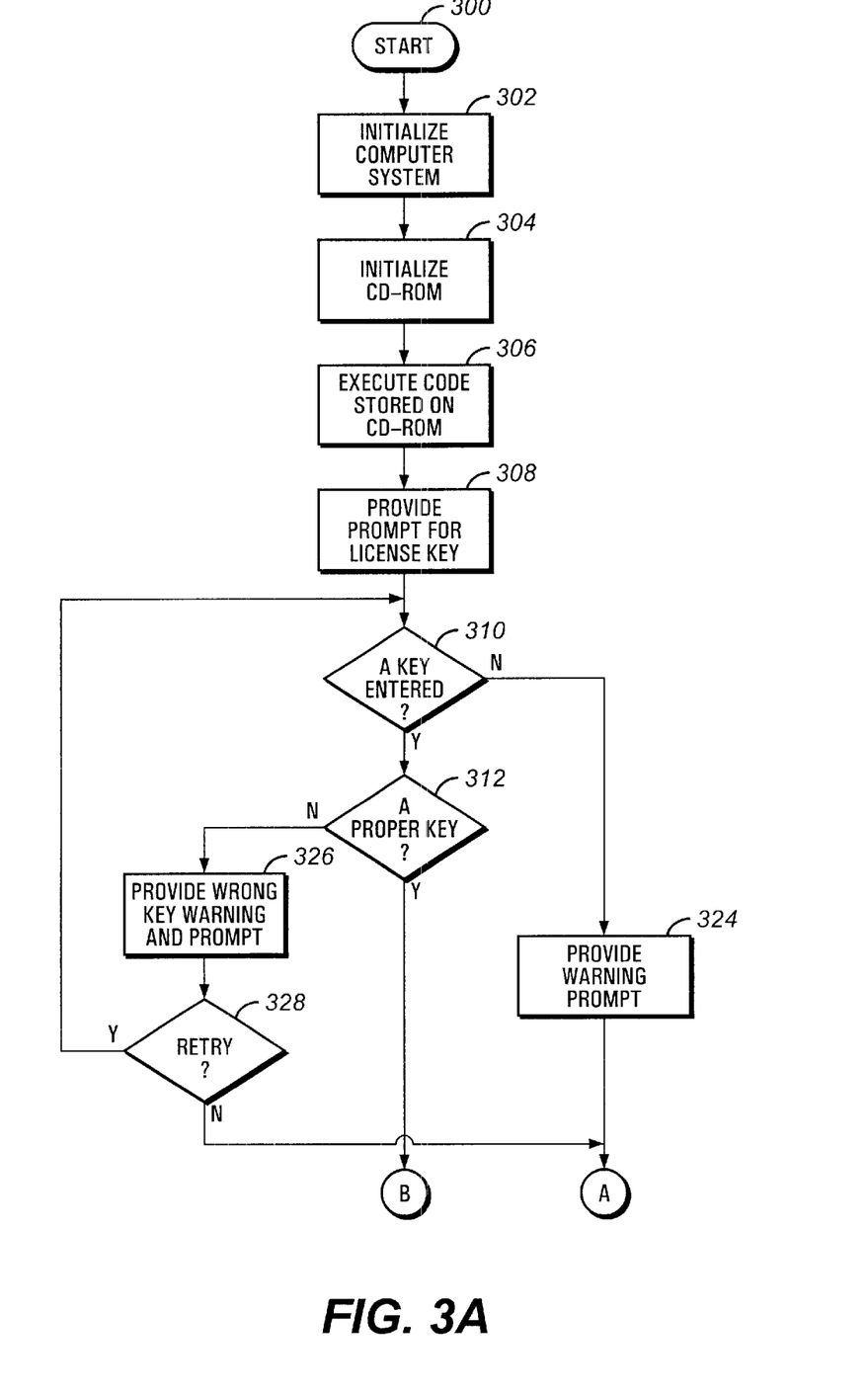
FIGS. 3A–3B are a flow chart of the installation process of a software application according to the invention.
Figure 3B:
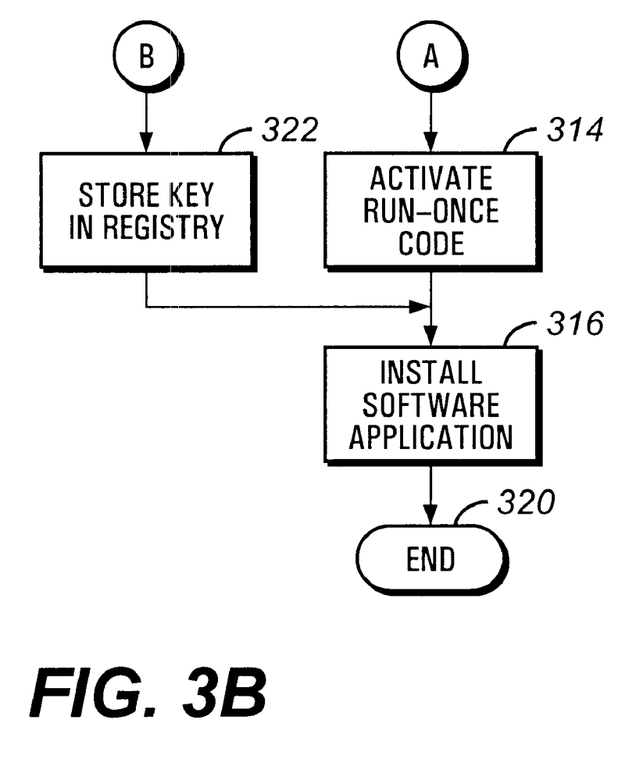
Figure 4A:
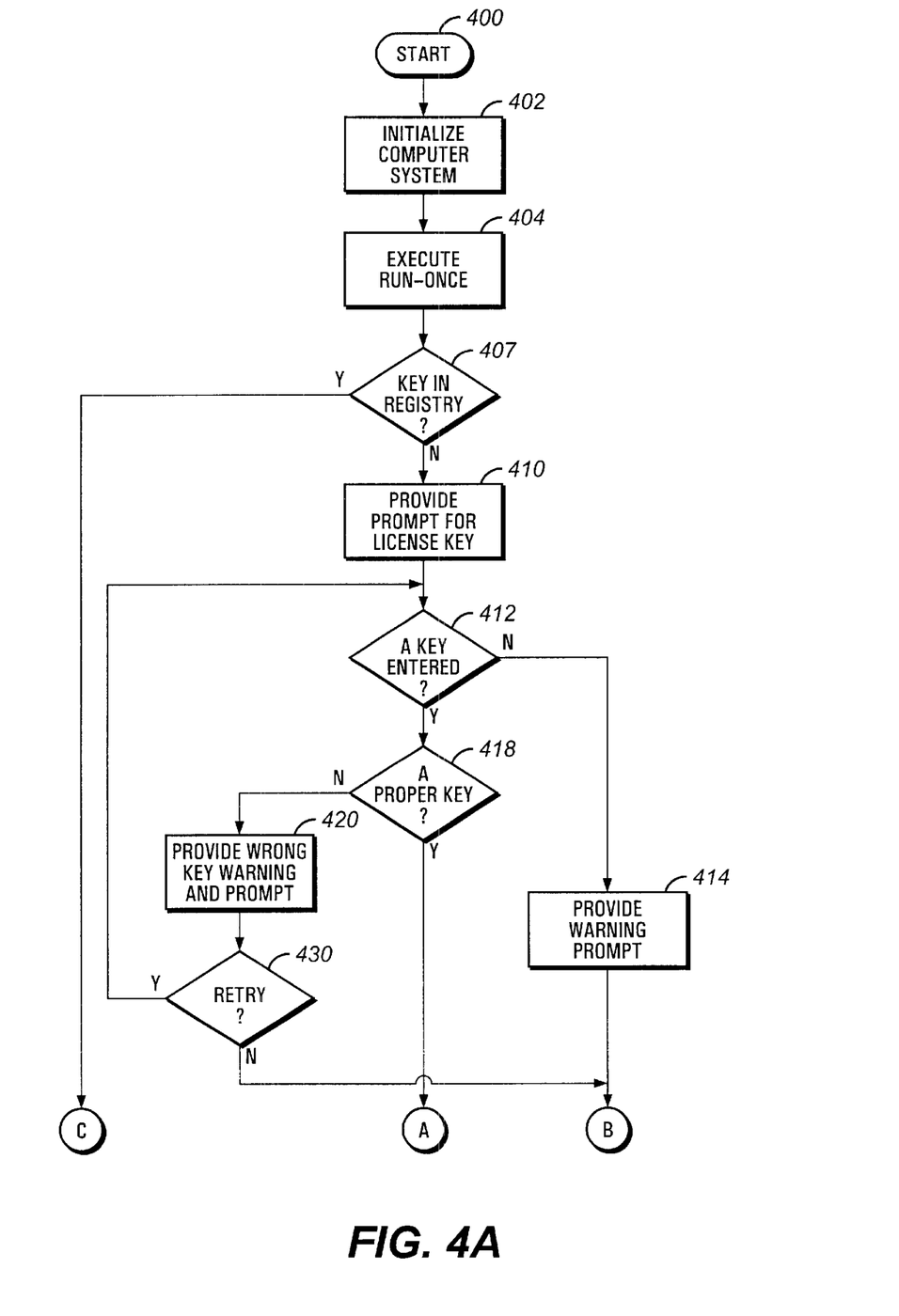
FIGS. 4A–4B are a flow chart of the startup execution of the installed software application according to the invention.
Figure 4B:
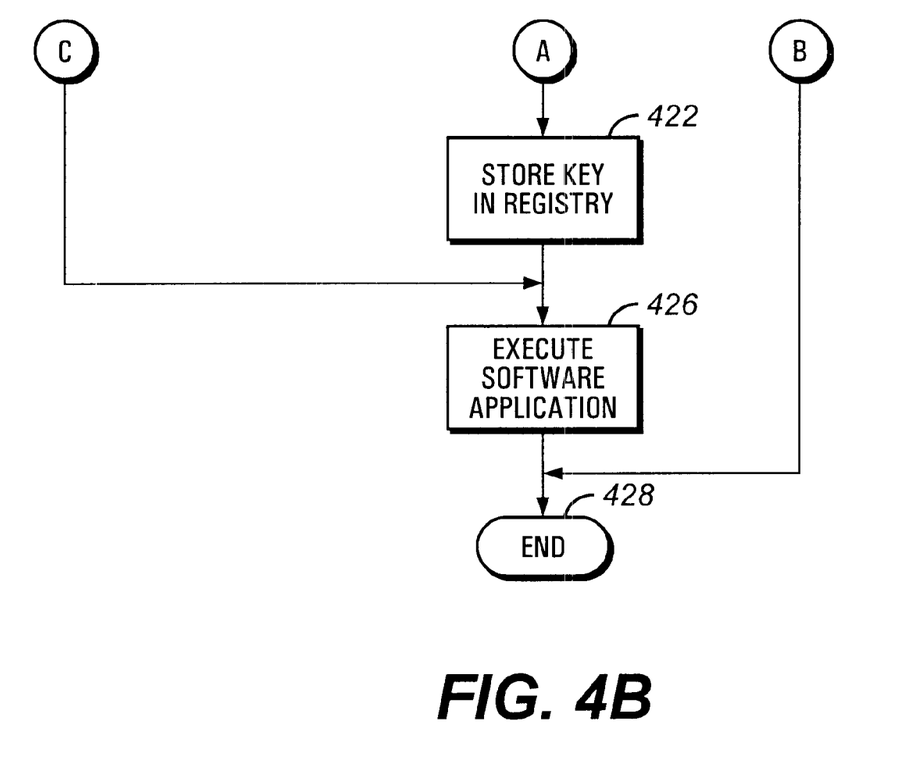

Turning now to FIGS. 3A–3B, a flow chart of the installation process of a software application is shown. The process begins with step 300, start, in FIG. 3A. Next, in step 302, the computer system S is initialized. This can be accomplished by cycling power, which is often called a hard or cold boot, or by performing a soft or warm boot. A soft or warm boot is often implemented as the pressing of the ctrl-del-alt keys, simultaneously, on the keyboard 68. Next, in step 304, the computer system S initializes the CD-ROM drive 84. After the CD-ROM 84 is initialized, the computer system S can access data contained on the CD-ROM disk placed in the CD-ROM drive 84. Next, the computer system S executes the installation executable code of the CD-ROM disk in step 306. In step 308, the computer system S provides a prompt for the license key (see FIG. 6) of the software application that is being installed. The computer system then monitors to see if a license key is entered in step 310. If no license key is entered, the computer system S provides a warning prompt in step 324. An exemplary copy of the warning prompt is provided in FIG. 8. After the warning prompt has been acknowledged, the computer system S activates the Run-Once code in step 314 in FIG. 3B. In this embodiment, the Run-Once code is activated such that the code disclosed in FIGS. 4A–4B is executed during computer system initiation. However, alternative embodiments, including embodiments adding or removing programs from a Run-Once entry could be implemented without detracting from the spirit of the invention. If a license key is entered in step 310, the computer system S determines if the license key entered is a proper key in step 312. If the license key that was entered was a proper license key, the computer system S stores the entered license key in the registry in step 322 in FIG. 3B. If the license key that is entered is not a proper license key the computer system S provides a wrong license key warning and prompt in step 326. The wrong license key warning and prompt provides that a license key was entered but is not a valid license key as determined by the process discussed in FIG. 2. An exemplary copy of the wrong license key warning and prompt is provided in FIG. 9. Next, computer system S monitors if the user wishes to re-enter a license key in step 328. If the user wishes to re-enter a license key, the computer system returns to step 310 and monitors if a license key has been entered. If the user does not wish to re-enter the license key, the computer system S proceeds to step 314 in FIG. 3B and activates the Run-Once code. After the valid license key has been stored in the registry in step 322 or the Run-Once code has been activated in step 314, the computer system S continues with the installation of the software application in step 316. After the installation of the software application, the process ends at step 320.

Turning now to FIGS. 4A–4B, a flow chart of the startup execution of the installed software application is shown. The process begins with step 400, start, in FIG. 4A. Next, in step 402, the computer system S is initialized. Next, in step 404, the Run-Once program that was activated in FIGS. 3A–3B, is executed as part of the start-up procedure which is a mechanism contained within the operating system. Next, in step 407, the computer system determines if the license key for the software application is stored in the registry. If the license key is stored in the registry, the computer system S proceeds to step 426 in FIG. 4B and continues execution of the software application. If the license key is not stored in the registry, the computer system S provides a prompt for the license key in step 410. An exemplary diagram of the prompt for license key during the startup execution process is provided in FIG. 7. After the prompt is provided in step 410, the computer system S determines if a license key has been entered in step 412. If no license key has been entered, the computer system S provides a warning prompt in step 414. An exemplary copy of the warning prompt is provided in FIG. 8. The process in step 428 in FIG. 4B. Once a key has been entered in step 412, the computer system S determines if the license key entered is a proper license key in step 418.

If a proper key is not entered in step 418, the computer system S provides a valid wrong license key warning and prompt in step 420. The wrong license key warning and prompt provides that a license key was entered but is not a valid license key as determined by the process discussed in FIG. 2. An exemplary copy of the wrong license key warning and prompt is provided in FIG. 9. Then computer system S monitors if the user wishes to re-enter a license key in step 430. If the user wishes to re-enter a license key, the computer system returns to step 412 and monitors if a license key has been entered. If the user does not wish to re-enter a license key, the computer system S proceeds to step 428 and the process ends. If a proper license key is entered in step 418, the computer system S continues with step 422 in FIG. 4B and stores the license key in the registry. Then the software application is executed in step 426 before the process ends in step 430. The Run-Once program is executed only on the initial startup after the software application is installed (as shown in FIGS. 3A–3B). The installed software application can be implemented such that the software application is executed when selected by the user, as compared to automatic execution at startup, without detracting from the spirit of the invention.

Figure 5:
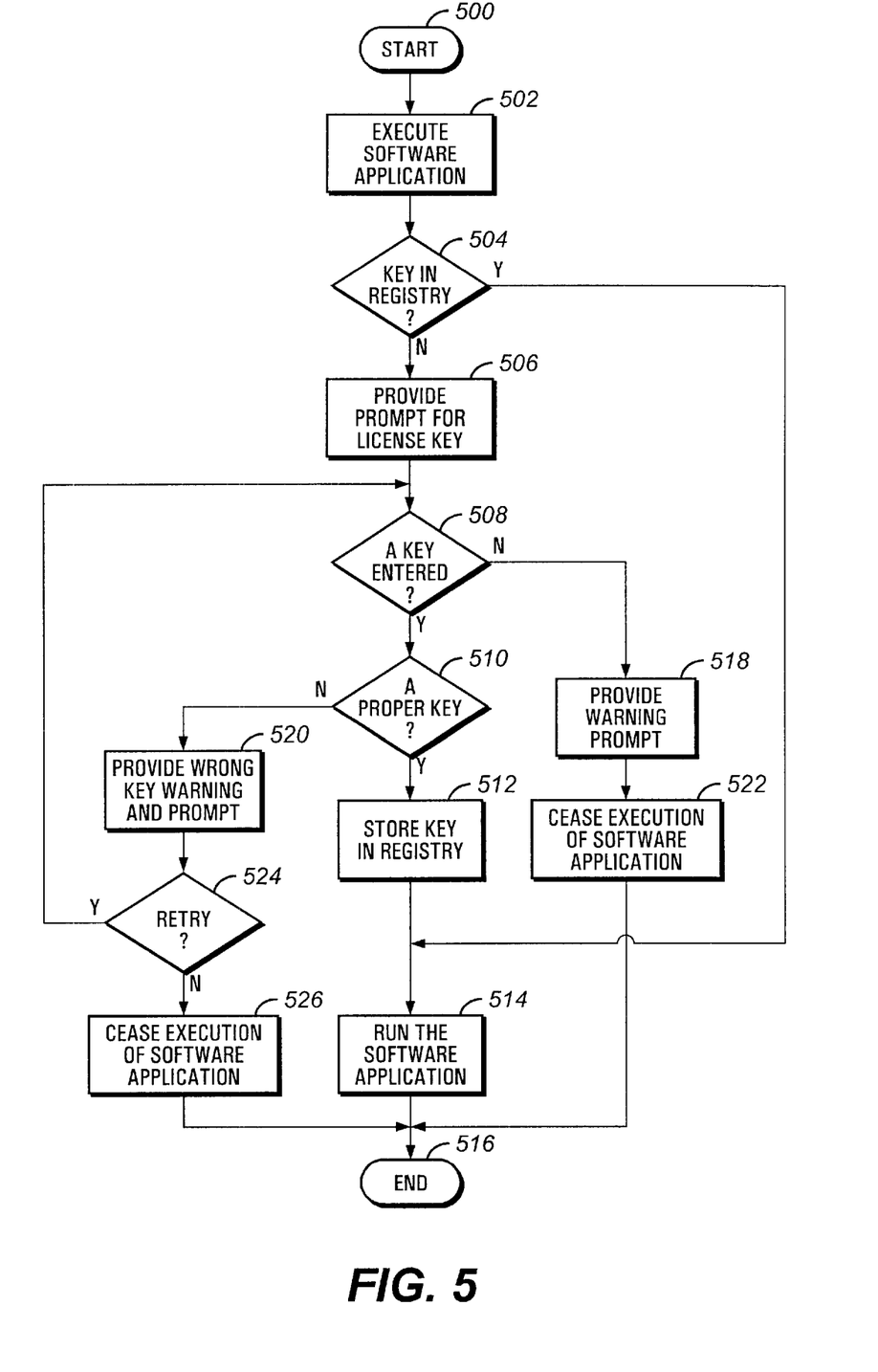
FIG. 5 is a flow chart of the execution of the installed software application according to the invention.

Turning next to FIG. 5, a flow chart of the execution of the installed software application is shown. The process begins with step 500, start. Next, in step 502, the software application is executed. The computer system S determines if the license key for the software application is stored in the registry in step 504. If the license key is stored in the registry, the computer system S runs the software application in step 514. If the license key is not stored in the registry, the computer system S provides a prompt for the license key in step 506. Next, in step 508, the computer system S determines if a license key has been entered. If no license key has been entered, the computer system S provides a warning prompt in step 518. An exemplary copy of the warning prompt is provided in FIG. 8. After the warning prompt has been acknowledged, the computer system S ceases execution of the software application in step 522 before ending the process in step 516. If a license key is entered, the computer system S determines if entered license key is a proper license key in step 510. If the license key is not a proper license key, the computer system S provides a wrong license key warning and prompt in step 520. The wrong license key warning and prompt provides that a license key was entered but is not a valid license key. Then computer system S monitors if the user wishes to re-enter a license key in step 524. If the user wishes to re-enter a license key, the computer system returns to step 508 and monitors if a license key has been entered. If the user does not wish to re-enter a license key, the computer system S proceeds to step 526 and ceases execution of the software application before ending the process in step 516. If a proper license key is entered, the computer system S stores the license key in the registry in step 512. Next the computer system S runs the software application in step 514. The process ends with step 516.

Figure 6:
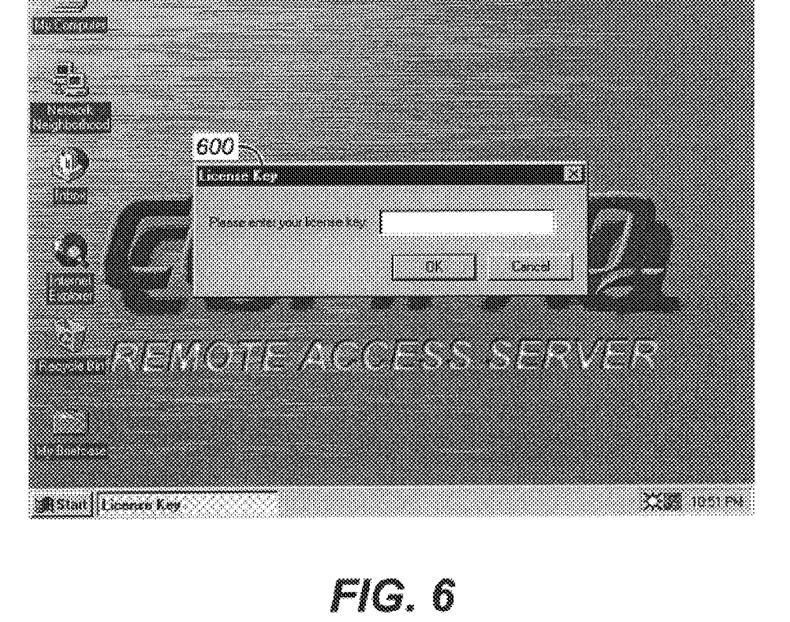
FIG. 6 is a diagram of the license key prompt as provided during the installation process.
Figure 7:
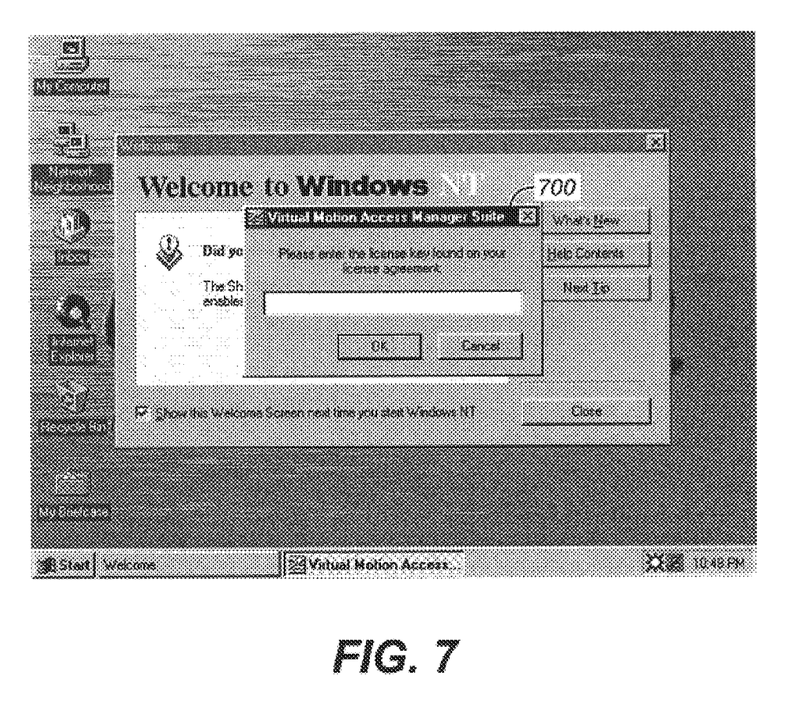
FIG. 7 is a diagram of the license key prompt as provided during execution of the software after installation.
Figure 8:
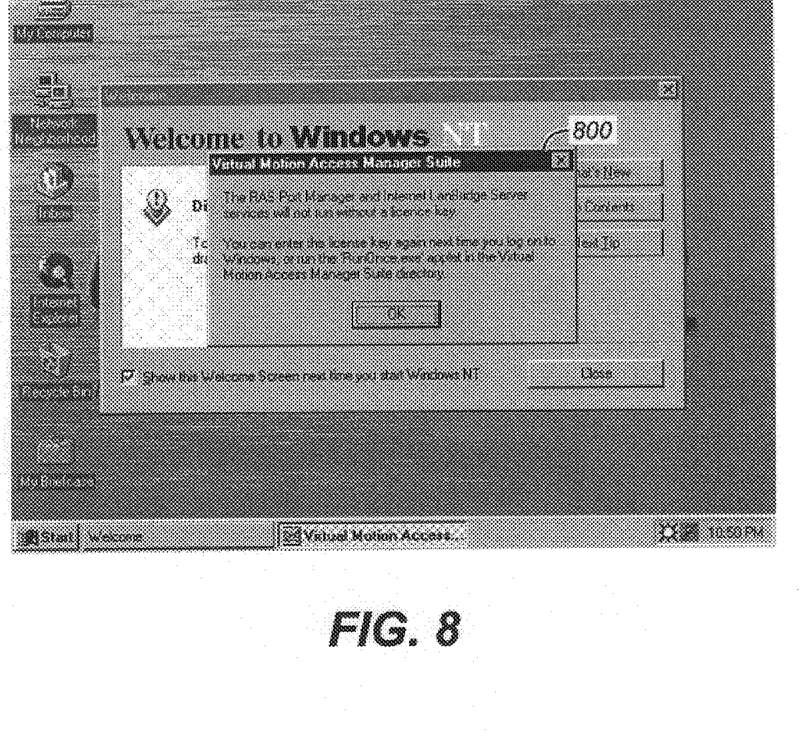
FIG. 8 is a diagram of the warning prompt as provided after an improper license key is entered during the execution of the software.
Figure 9:
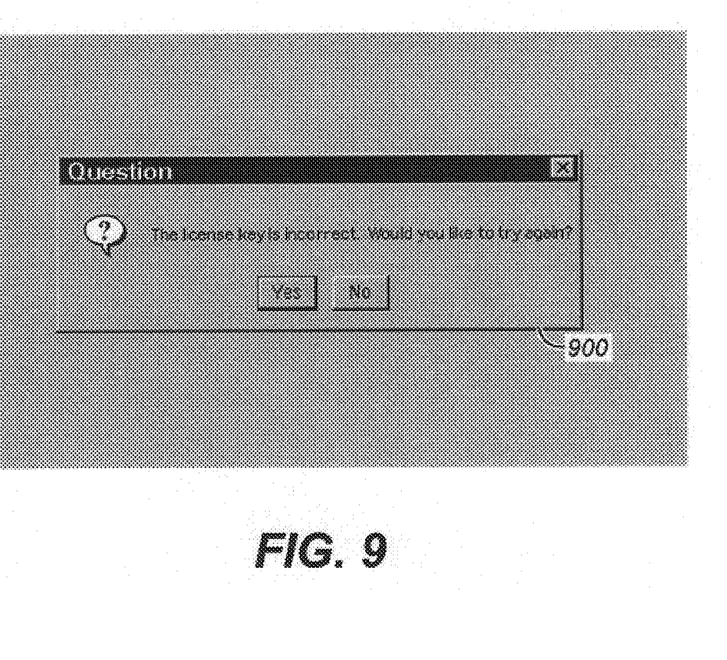
FIG. 9 is a diagram of the wrong key warning and prompt as provided during the installation process, the startup process, and the execution of the software after installation process.

Turning next to FIGS. 6, 7, 8, and 9, exemplary diagrams of the license key prompts are provided. In FIG. 6, the license key prompt 600 that is provided during the installation process is shown. The license key prompt allows the user to enter a license key and then designate, with "okay" or "cancel", whether or not the user wishes to continue with the process of entering the license key. In FIG. 7, the license key prompt 700 used during the startup execution of the software application is shown. The prompt allows the user to enter the license key found in the separate license documentation provided with the software application. The license key prompt 700 allows the user to enter the license key and they select "okay" to enter that license key or "cancel" to exit the software application. In FIG. 8, the warning prompt 800 that is used during the startup execution process of the software application is shown. The warning prompt 800 explains that a license key must be entered and that the software application will not function without a license key. The warning prompt 800 also explains that the license key entry process can be restarted by executing the run-once executable. Otherwise the license key prompt will not appear until windows is re-entered, or the computer system S is rebooted. The warning prompt 800 only allows the user to select an acknowledgement of the warning of license key prompt 800. In FIG. 9, the wrong key warning and prompt 900 is shown. The wrong key warning and prompt 900 allows the user to designate, with "okay" or "cancel", whether or not the user wishes to re-enter another license key.

The foregoing disclosure and description of the invention are illustrative and explanatory thereof, and various changes to the size, shape, materials, components, circuit elements, wiring connections and contacts, as well as in the details of the illustrated circuitry and construction and method of operation may be made without departing from the spirit of the invention.

We claim:

1. A computer system for allowing the pre-installation and operation of a software application without entering a key, the computer system comprising:

a processor;

a mass storage subsystem coupled to the processor;

a data transfer device coupled to the processor; the data transfer device for outputting the software application to the computer system; and installation and operating software code residing in a data transfer media, the installation and operating software code, when executed by the processor, performing the steps of:

executing the startup code, further comprising the steps of:

upon execution of the startup code, determining if a key is stored in the registry;

if the key is not stored in the registry, providing a user discernable prompt, the user discernable prompt requesting a first key;

if the first key is proper, storing the first key in the registry;

executing the software application, further comprising the steps of:

upon execution of the software application, determining if the first key is stored in the registry;

if the first key is stored in the registry, continue execution of the program;

if the first key is not stored in the registry providing a user discernable prompt; the user discernable prompts requesting a second key;

if the second key is not proper, ceasing execution of the software application; and if the second key is proper, storing the key in the registry and continue execution of the program.

2. The computer system of claim 1, wherein the step of providing the user discernable prompt includes providing a visual user prompt.

3. The computer system of claim 1, wherein the step of providing the visual user prompt includes providing an indication on a computer screen.

4. The computer system of claim 1, wherein the step of determining if the first key is proper and the second key is proper includes comparing the first key and the second key with a defined set of pre-determined proper keys.

5. The computer system of claim 1, wherein the step of determining if the first key is proper and the second key is proper includes comparing the first key and the second key with an algorithmic solution.

6. A computer system for allowing the pre-installation and operation of a software application without entering a key, the computer system comprising:

a processor;

a mass storage subsystem coupled to the processor;

a data transfer device coupled to the processor; the data transfer device for outputting the software application to the computer system; and a software code residing in a data transfer media, the software code including a startup code and a software application, the software code when executed by the processor adapted to perform the steps at start up of:

determining if the key is stored in a registry;

if the key is not stored in the registry, providing a user discernable prompt, the user discernable prompt requesting a first key;

determining if the first key is proper; and if the first key is proper key, storing the first key in the registry;

the software code when executed by the processor adapted to perform the steps during execution of the software application of:

determining if the first key is stored in the registry;

if the first key is stored in the registry, continue execution of the software application;

if the first key is not stored in the registry, providing a user discernable prompt, the user discernable prompts requesting a second key;

determining if the second key is proper;

if the second key is proper, ceasing execution of the software application; and if the second key is proper, storing the second key in the registry and continue executing the software application.

7. The computer system of claim 6, wherein the step of determining if the first key is proper and the second key is proper includes comparing the first key and the second key with a defined set of pre-determined proper keys.

8. The computer system of claim 6, wherein the step of determining if the first key is proper and the second key is proper includes comparing the first key and the second key with an algorithmic solution.

* * * * *